May 12, 1953  G. F. JONES  2,637,971
HYDRAULIC POWER INSTALLATION
Filed April 16, 1951  3 Sheets-Sheet 2

Inventor
George F. Jones
By
[signature]
Attorney

May 12, 1953

G. F. JONES 2,637,971

HYDRAULIC POWER INSTALLATION

Filed April 16, 1951

Inventor
George F. Jones
By
Attorney

Patented May 12, 1953

2,637,971

UNITED STATES PATENT OFFICE 2,637,971

HYDRAULIC POWER INSTALLATION

George Frederick Jones, Aldwych, London, England, assignor to Commercial Patents Limited, London, England, a British company Application April 16, 1951, Serial No. 221,172
In Great Britain April 25, 1950

8 Claims. (Cl. 60—19)

This invention has reference to improvements in and relating to hydraulic power installations intended primarily but not exclusively for the propulsion of locomotive and other land vehicles.

The invention is applied to power installations wherein two power units each comprising a compression ignition engine and an hydraulic pump supply liquid under pressure to an hydraulic motor having a power capacity corresponding to the sum of the power capacities of the pumps (allowance being made for losses) said motor being arranged to turn a drive shaft; and the principal object of the invention is the provision of such an installation giving a larger initial tractive effort i. e., an installation wherein hydraulic fluid at high pressure is available at start-up. The invention is, therefore, particularly advantageous when applied to a locomotive, for example.

According to the present invention the hydraulic pump of one of said power units is of constant speed type variable as to output whilst the pump of the other unit is of variable speed type; and incorporated in the installation is hand-regulated control gear arranged to bring the constant speed pump up to substantially maximum output before bringing in the variable speed pump, next to bring the variable speed pump up to maximum output and then when desired to reduce the outputs in reverse order (i. e., first the output of the variable speed pump and afterwards that of the constant speed pump), the gear also being arranged to bring about the operation of a power valve which, when the variable speed pump is to be brought into use, diverts the liquid pumped thereby from an idling circuit to the motor, and which when the variable speed pump is taken out of use returns the liquid to the idling circuit.

An automatically operating "coasting" or "short-circuiting" valve is preferably provided between the flow-return pipes of the motor, which is reversible, to permit of easy circulation of fluid through the motor whilst avoiding the inclusion of the whole of the said pipes and other components (valves and service tank) in the circuit. Said valve is preferably of plug type actuated by springs and fluid pressure. The actuating means comprises a cylindrical rack having a piston at each end and meshing with a pinion on the plug or plug shank. The rack is urged towards a centre position in a cylinder in which position, through the pinion, it has opened the valve for coasting; whilst when the motor receives pressure fluid from one side or the other of a reversing valve (hand operated) fluid flowing to the pump acts on one piston or the other and causes the rack to close the coasting valve, that part of the cylinder containing one of the pistons being connected to one flow-return pipe of the motor and that part of the cylinder containing the other piston being connected to the other flow-return pipe of the motor, both in proximity to the motor.

The hand control gear preferably includes a hydraulic relay, the power element thereof (piston or ram) being arranged to change the power output of the constant speed pump as desired and to control the power valve which either allows the liquid from the variable speed pump to idle or brings it into the power circuit.

The hydraulic relay is preferably controlled by a hand-rotated cam and the variable speed pump is preferably controlled by a hand rotated cam. The profile of the cam associated with the relay is concentric beyond the part which leads up to full output of the constant speed pump so that the second cam, preferably on the shaft of the first, can take up the control of the variable speed pump—by the said shaft being further rotated—without the constant speed pump being affected until the shaft is reversed or turned sufficiently to cut out the variable speed pump.

The power valve control preferably includes a slide valve adapted to be displaced by the hydraulic relay. The slide valve is preferably spring loaded in one direction (say the direction in which the slide moves when progressing towards the position it occupies to cause the power valve to effect idle circulation of the liquid from the variable speed pump).

The power valve preferably comprises a vane in a segmental chamber; its shaft is rigid with the plug or cylindrical core of a plug valve. The plug valve body has an inflow duct at one side and two appropriately located outflow ducts which are selectively put into communication with the inflow duct by a segmental passage in the plug.

An installation in accordance with the invention will now be described with reference to the accompanying drawings wherein.

Figure 1:
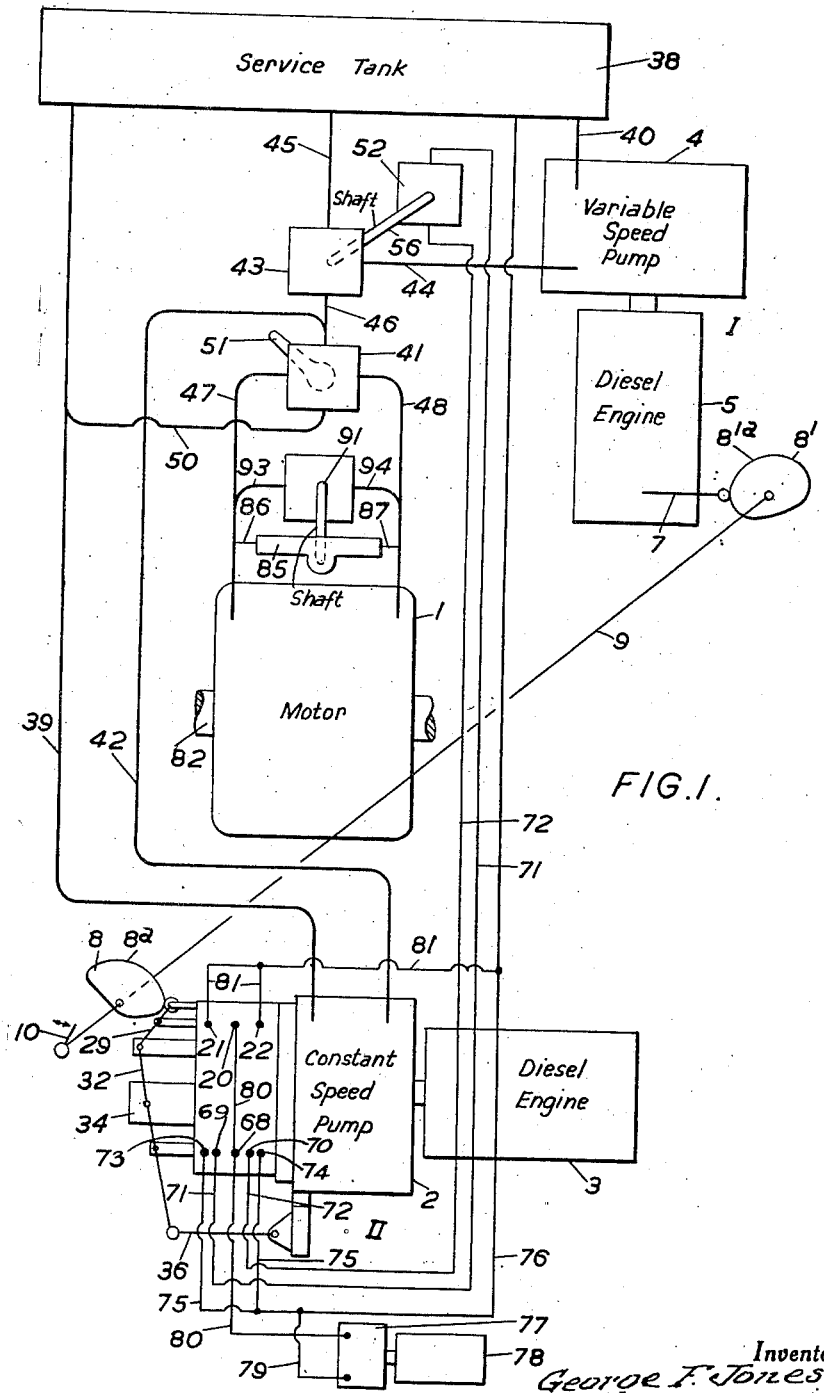
Fig. 1 is a diagrammatic layout of the installation.

The hydraulic control gear of the installation is shown in its mid-position, i. e., the position wherein the constant speed pump is giving maximum output and the variable speed pump is about to come into use.

The installation shown comprises two power units I and II adapted to supply pressure fluid to a reversible hydraulic motor 1. The unit I comprises a constant speed pump 2 and a diesel engine 3 for driving it; and the unit II comprises a variable speed pump 4 and a diesel engine 5 for driving it. The pumps have substantially the same maximum output; the sum of their output is about equal to the power rating of the motor.

Both pumps are of known type and, of course, so are the engines and the motor.

In the example shown the pump 2 is of the kind wherein the output thereof is varied by altering the phase displacement of one of two groups of pistons relative to the pistons of the other group by angularly displacing an eccentric reciprocating the first group in relation to an eccentric reciprocating the second group, each piston of each group being paired with a piston of the other group and the pistons so paired being arranged to deliver fluid into a common pressure chamber at the head of their respective cylinders. The said angular displacement is effected by axially shifting a fast screw thread 6 co-axial with the pump shaft, said thread 6 engaging an internally screw-threaded sleeve around which the eccentric for one of the groups of pistons is fixed. The screw thread 6 is keyed to the pump shaft so that it can only move axially in relation thereto; hence whilst axial movement of the screw thread can turn the sleeve and eccentric other rotational movements take place with the pump shaft and screw thread.

The output of pump 4 is varied by controlling the speed of the engine 5. This is effected by means of the conventional control rod 7.

Axial displacement of the fast screw thread to vary the output of the pump 2 is effected when a cam 8 is turned; and variation of the speed of engine 5, to vary the output of pump 4, is effected when a cam $8^1$, on the same shaft 9 as cam 8, is turned, turning of the cam $8^1$ displacing the control rod 7 of the engine 5. The cams are relatively set to operate in sequence; both are rotated by means of a hand lever 10 fixed to the shaft 9.

The action of the cam 8 is transmitted to the fast screw thread 6 by a hydraulic relay generally indicated by R. This comprises a body 11 having three parallel bores 12, 13 and 14, respectively. Bore 12 contains a plunger 15 loaded by a spring 16; bore 13 contains a dumb-bell valve 17; and bore 14 contains a ram 18 having a piston head 19. The body has a middle inlet 20 for pressure fluid to the bore 13 and two outlets 21 and 22, respectively (beyond the dumb-bell enlargement) for the fluid; the body also has two ducts 23 and 24, respectively, for the passage of fluid between the bore 13 and the bore 14, said ducts being closed by the dumb-bell enlargements when the dumb-bell is in its middle-position and communicating with the bore 14 at opposite sides of the piston head 19.

Plunger 15 projects from the body 11 at one end and carries a clevis 25 in which is a roller 26. The cam 8 bears against this roller. The dumb-bell valve 17 has a part projecting from the body at the same end; this part carries a cross pin 27 entering a slot 28 in an inclined link 29. The extremities of the roller spindle 30 also enter the slot. The ram 18 likewise extends beyond the body 11 and is pivotally joined to the link 29 at 31. Also pivotally joined to the cam at 31 is a downwardly extending lever 32; this is pivotally joined at 33 to a slide bar 34 mounted in the pump casing 35, and the bottom of the bar is pivotally attached to the pump casing by means of a bridle link 36.

The operation of the relay is as follows:

Rotation of the cam either allows the plunger 15 to move outwards or moves the plunger inwards. This results in the dumb-bell valve 17 being initially displaced in the same direction as the plunger owing to the link 29 fulcruming on the pivot 31. Such displacement of the dumb-bell valve 17 allows pressure fluid to flow from the middle of the bore 13 to one end or the other of the bore 14 and, therefore, the ram 18 is displaced in a direction opposite to that in which the plunger 15 was moved. When the ram is so displaced the link 29, by fulcruming on the roller spindle 30, restores the dumb-bell valve 17 to its mid-position, so cutting off the supply of pressure fluid and thereby stopping the ram after the latter has moved an amount commensurate with the displacement of the plunger 15. It will be appreciated that, when the ram 18 moves, liquid exhausts from one end or the other of the bore 14 by that duct 23 or 24 not in communication with the inlet 20 and by the corresponding outlet 21 or 22.

Displacement of the ram as above described pushes the lever 32, or pulls it, and this because of the connection 33, correspondingly moves the slide bar 34. The slide bar is connected to the fast screw thread 6 by a double-thrust ball bearing 37. Hence, the screw thread is displaced axially by the lever 32, which latter is displaced by the cam 8 through the relay R.

The intake sides of the pumps are connected to a service tank 38 by pipes 39 and 40, respectively, the delivery side of the pump 2 is connected directly to the intake side of a reversing valve 41 by way of a pipe 42 whilst the delivery side of the variable speed pump is connected to a power valve 43 by way of a pipe 44, said valve having a connection 45 to the service tank and a connection 46 to the intake side of the reversing valve. The pressure liquid from the valve and, therefore, from the pumps passes to the motor either by way of pipe 47 or by way of pipe 48 according to the setting of the plug 49 of the reversing valve; and the spent liquid returns to the valve by whichever of these pipes 47 or 48 is on the exhaust side of the motor, said liquid flowing from the valve 41 by way of a pipe 50 connected to the service tank by pipe 39. Rotation of the plug 49 is effected by a hand lever 51.

The power unit of the power valve comprises a body 52 having a segmental recess 53 in which a vane 54 is located. The body has inflow-outflow ducts 55 and the vane takes a position in the recess furthest from whichever of the ducts is receiving pressure liquid for the time being. The vane is fixed to a shaft 56 rigid with the plug 57 of the valve 43. When the vane is in one extreme position the duct 58 in the plug 57 connects pipes 44 and 46 together and when the vane is in the other extreme position the said duct connects the pipe 44 to the service tank by way of the pipe 45 so that the liquid pumped by the pump 4 idles.

Figure 2:
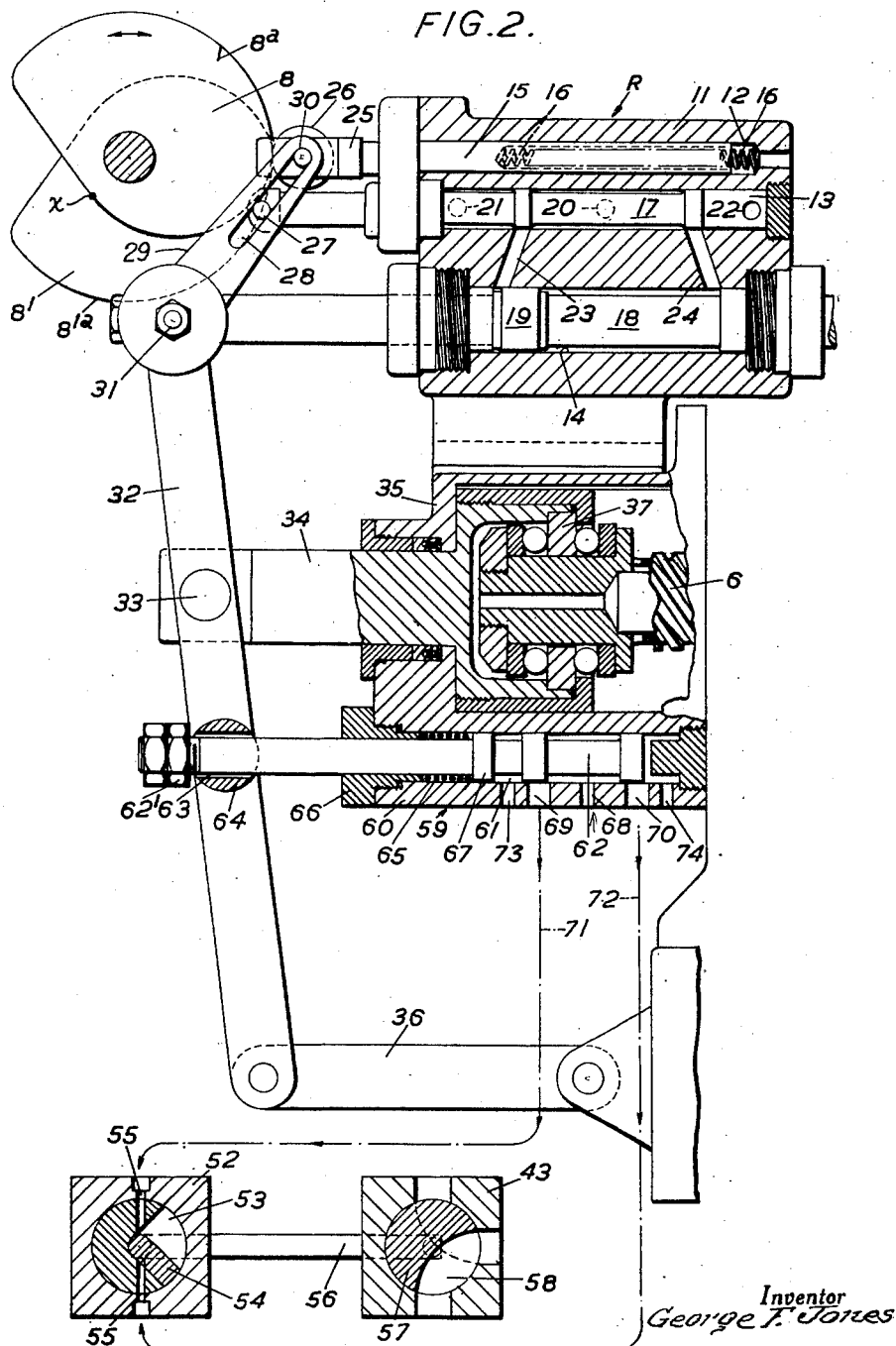
Fig. 2 is a somewhat diagrammatic side view, partly in section, showing more particularly the hydraulic relay, the operating cam therefor and the power valve.
Figure 3:
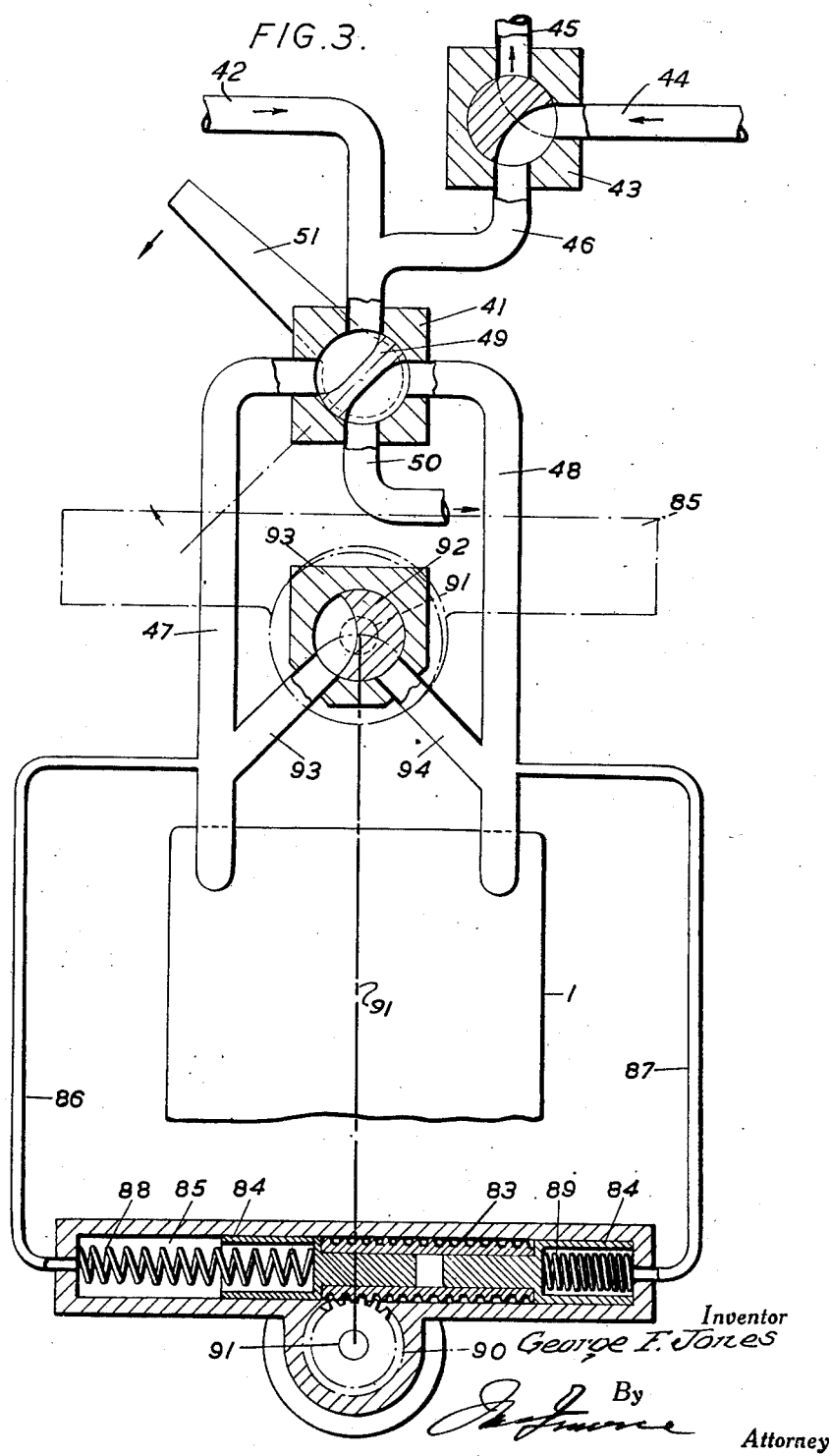
Fig. 3 is a diagrammatic layout showing, more particularly, the plug component of the power valve, the reversing valve and an automatic coasting valve.

The power valve is automatically controlled by a supply valve operated by the relay, said valve is, as shown preferably in the form of a slide valve 59 the body 60 of which is integral with the pump casing part 35. The said body has a bore 61 parallel with the bores in the relay body and with the slide bar 34, and the said bore 61 contains a slide 62 one end of which extends from the body and passes through a hole 63 in a trunnion 64 carried by the lever 32. A spring 65 between a nut 66 surrounding the extended part of the slide and one of the enlargements 67 on the slide tends to urge the extended part inwardly of the bore 61 whilst a head nut 62¹ on the said part prevents this and causes the lever 32 to pull the extended part outwards against the spring action shortly before the lever reaches its extreme position to the left of Fig. 2. Pressure liquid enters the valve 59 by way of a central duct 68, flows through duct 69 or duct 70 to the power unit of the power valve by way of pipes 71 or 72 connected to the respective ducts 69 or 70 and to the opposite sides of the unit, and returns from the unit either by pipe 72 or 71 and duct 70 or 69, and exhausts either through duct 73 or 74. Ducts 73 and 74 are connected to the service tank by pipes 75 and 76.

The pressure liquid for the valve 59 and for operating the relay R is supplied by an auxiliary pump 77 driven by an engine 78. Liquid is drawn from the service tank by way of a pipe 79 and pipe 76 and is delivered to the valve 59 and relay duct 20 by a pipe 80. The liquid exhausts from the relay by way of the ducts 21 and 22 as previously stated and is conducted thence to the service tank by pipes 81, which join pipe 76.

It might again be mentioned that the cams are shown turned through about half their full angle of rotation.

When the operator turns the hand lever 10 clockwise (Figs. 1 and 2) from the start position (the position at which the dot $x$ on the operative part of the profile of the cam 8 is in contact with the roller 26, the plunger 15 moves inwards with the result that the slide bar 34 moves outwards. Continued outward movement of the slide bar causes the output of the pump 2 to increase and this continues up to maximum, the cams by this time having reached the position shown in the drawings.

Until a short time before the said position was reached the vane 54 was extending upwards so that the pump 4 was idling, movement of the lever 32 not having affected the slide 62 until just before the lever position shown in the drawings was reached because of the lost motion coupling effect of the trunnion on the slide extension. The last part of the outward (leftward, Figs. 1 and 2) movement of the lever 32 brings the trunnion into engagement with the head nut 62¹ with the result that the slide 62 is shifted to the position shown in Fig. 2 and the vane 54 thus caused to occupy the position shown in this figure. The movement of the vane causes corresponding movement of the plug 57 so that the previously idling liquid is directed to the valve 41 and thence to the motor.

Further clockwise movement of the cam 8 is ineffective on the plunger 15 because the concentric part 8ᵃ of the cam profile is in contact with the roller. Further clockwise movement of the cam 8¹ however carries the concentric part 8¹ᵃ of the cam 8¹ beyond the control rod 7 and the eccentric or operative part of the cam takes charge of the rod, thus speeding up the pump 4.

Return operation of the lever 10 first progressively slows the pump 4 and by the time idling speed is reached the cam 8 allows the plunger 15 to move outwards, whereupon the ram 18 moves inwards and the lever 34 follows it. During the initial part of this lever movement the slide 62 moves inwards, thereby causing the plug 57 to be returned to the idling position. Continued return operation of the lever progressively reduces the output of the pump 2, zero output being reached when the point $x$ engages the roller 26.

The direction of the motor 1 is, of course, determined by the setting of the reversing valve. Normally the valve is set for forward rotation of the motor shaft 82. Operation of the valve to direct the pressure fluid to the pipe 48 (instead of to the pipe 47 as shown in the drawings) causes reversal of the motor, the pipe 47 receiving the exhaust liquid and directing it into the pipe 50 communicating with the service tank.

The installation shown incorporating an automatic by-pass valve to permit of coasting of the motor, a condition which obtains, for example when the motor is coupled to the wheels of a locomotive. This automatic by-pass or coasting valve comprises a cylindrical rack 83 having piston ends 84, which rack and pistons are slidable in a cylinder 85 connected at its ends to the pipes 47 and 48 by pipes 86 and 87 respectively. The rack and pistons are loaded by springs 88 and 89 which latter tend to hold the rack centrally of the cylinder. The rack meshes with a pinion 90 located in the body comprising the cylinder 85; and the shaft 91 of the pinion is rigid with the plug 92 of a by-pass valve 93.

When the motor 1 is driven by pressure liquid the rack and pistons lie at one end or the other of the cylinder 85, according to which of the two pipes 86 or 87 is in communication with the pressure pipe for the time being. Movement of the rack from its mid-position by the pressure liquid causes it to rotate the pinion and the pinion rotates the plug 92 of the by-pass valve to a closed position. When, however, neither pipe 47 nor pipe 48 is a pressure pipe (a condition which would obtain during coasting), the rack 83 occupies its mid-position and the rack, in moving to this position rotates the pinion which, in turn, rotates the plug 92 to its mid- or by-pass position. Liquid "pumped" by the motor 1 is now able to idle through the valve since the valve is connected to the pipes 47 and 48 by pipes 93 and 94 respectively.

From the above description of the drawings it will be evident that the installation can be fully controlled by but two hand levers (10 and 51) lever 10 effecting all speed controls for forward and reverse running and lever 51 controlling the direction of this running.

The shaft 82 may be connected directly to cranks at its ends, said cranks being coupled to the wheels of a locomotive for example or reduction gearing may be included in the drive transmission from the said shaft to the locomotive wheels or other parts to be driven.

What I claim is:

1. A hydraulic power installation comprising a first pump of the type giving a variable volumetric output when driven at constant speed and a constant speed compression-ignition engine for driving same, a second pump capable of giving a volumetric output varying with speed and a variable speed compression ignition engine for driving same, an hydraulic motor, the maximum total rated power output as pressure fluid of the pumps being substantially equal to the rated power capacity of the motor, a hydraulic flow connection between said first pump and said motor and a hydraulic flow connection between said second pump and said motor, a hydraulic idling circuit, a power valve, said power valve being connected to said hydraulic flow connection between said second pump and said motor and to said idling circuit and being operable to connect said hydraulic flow connection either to said motor or to said hydraulic idling circuit, and hand-operated control gear comprising means for regulating the output of said first pump, means for operating said power valve and means for regulating said engine driving said second pump, said hand-operated control gear being adapted to bring the first pump up to maximum output, then to operate said power valve to connect said hydraulic flow connection from said second pump to said motor and then to speed up said second pump, and conversely, to slow down the second pump, operate the power valve to connect said hydraulic flow connection from said second pump to said idling circuit and then to reduce the output of said first pump.

2. A hydraulic power installation comprising a first pump of the type giving a variable volumetric output when driven at constant speed and a constant speed compression-ignition engine for driving same, a second pump capable of giving a volumetric output varying with speed and a variable speed compression-ignition engine for driving same, a reversible hydraulic motor, the maximum total rated power output as pressure fluid of the pumps being substantially equal to the rated power capacity of the motor, a hydraulic flow connection between said first pump and said motor and a hydraulic flow connection between said second pump and said motor, a hydraulic idling circuit, valve means for connecting and disconnecting said flow connection between said second pump and said motor to and from said idling circuit, and hand-operated control gear comprising means for regulating the output of said first pump, means for operating said valve means and means for regulating the variable speed engine, a reversing valve, said reversing valve being included in the hydraulic flow connections between said pumps and said motor, one of said flow connections extending from one way of the valve to one side of the motor and another of said flow connections extending from another way of the valve to the other side of said motor, a by-pass valve, means for connecting said by-pass valve between said hydraulic flow connections extending from said reversing valve to said opposite sides of the motor, means responsive to pressure in one or the other of said flow connections extending to said opposite sides of said motor for closing said by-pass valve and means responsive to fall of pressure in said flow connections for opening said by-pass valve.

3. A hydraulic power installation according to claim 2, said pressure responsive means comprising a cylinder, pistons in said cylinder and a rack between said pistons, a pinion meshing with said rack and a drive connection between said pinion and said by-pass valve, said cylinder having means hydraulically connecting its opposite ends respectively to said flow connections between said reversing valve and said opposite sides of said motor, and said means responsive to said pressure fall comprising loading springs acting on said rack.

4. A hydraulic power installation according to claim 1, said means for regulating said first pump comprising a hydraulic relay, a hand-rotated cam for controlling said relay and coupling means between said relay and the regulating means of said first pump for transmitting movements of said relay to said first pump regulating means.

5. A hydraulic power installation according to claim 4, said means for operating said power valve comprising a hydraulic valve, fluid flow connections between said hydraulic valve and said power valve for supplying operating fluid to said power valve, and a drive connection between said hydraulic relay and said hydraulic valve.

6. A hydraulic power installation according to claim 4, said means for operating said power valve comprising a hydraulic valve, fluid flow connections between said hydraulic valve and said power valve for supplying operating fluid to said power valve, and a lost motion drive connection between said hydraulic relay and said hydraulic valve for operating said hydraulic valve at one extreme of movement of said relay.

7. A hydraulic power installation according to claim 4, comprising a second cam for regulating said second pump, said cams being mounted on a common shaft and set relatively to operate sequentially.

8. A hydraulic power installation according to claim 1, said power valve comprising means defining a segmental chamber, a vane movable in said chamber, fluid flow connections to the opposite sides of said chamber, a two way valve having a movable element, and a drive connection between said vane and said movable element, said means for operating said power valve comprising a hydraulic valve and flow connections therefrom to said flow connections to the opposite sides of said chamber.

GEORGE FREDERICK JONES.

References Cited in the file of this patent

UNITED STATES PATENTS

| Number | Name | Date |
|---|---|---|
| 2,483,349 | Patty et al. | Sept. 27, 1949 |

FOREIGN PATENTS

| Number | Country | Date |
|---|---|---|
| 238,886 | Great Britain | Nov. 19, 1926 |